United States Patent
Yu et al.

(10) Patent No.: US 10,437,468 B2
(45) Date of Patent: Oct. 8, 2019

(54) ELECTRONIC APPARATUS HAVING TOUCH PAD AND OPERATING METHOD OF ELECTRONIC APPARATUS

(71) Applicants: Feng-Yi Yu, Taipei (TW); Chia-Shin Weng, Taipei (TW); Hsin-Pei Tsai, Taipei (TW); Jih-Houng Lee, Taipei (TW); Kuan-Yu Chen, Taipei (TW)

(72) Inventors: Feng-Yi Yu, Taipei (TW); Chia-Shin Weng, Taipei (TW); Hsin-Pei Tsai, Taipei (TW); Jih-Houng Lee, Taipei (TW); Kuan-Yu Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 202 days.

(21) Appl. No.: 15/098,324

(22) Filed: Apr. 14, 2016

(65) Prior Publication Data

US 2016/0349989 A1 Dec. 1, 2016

(30) Foreign Application Priority Data

May 26, 2015 (TW) .............................. 104116807 A

(51) Int. Cl.
| | |
|---|---|
| G06F 3/0483 | (2013.01) |
| G06F 3/0481 | (2013.01) |
| G06F 3/0488 | (2013.01) |
| G06F 3/041 | (2006.01) |
| G06F 3/147 | (2006.01) |
| G06F 3/0489 | (2013.01) |
| G06F 3/0484 | (2013.01) |
| G09G 5/14 | (2006.01) |

(52) U.S. Cl.
CPC .......... *G06F 3/04886* (2013.01); *G06F 3/041* (2013.01); *G06F 3/04847* (2013.01); *G06F 3/04883* (2013.01); *G06F 3/04897* (2013.01); *G06F 3/147* (2013.01); *G09G 5/14* (2013.01); *G06F 2203/04803* (2013.01)

(58) Field of Classification Search
CPC ............... G06F 3/0488; G06F 3/04886; G06F 3/04842; G06F 3/0481
See application file for complete search history.

(56) References Cited

U.S. PATENT DOCUMENTS 5,910,009 A * 6/1999 Leff ...................... G09B 21/00
434/236
9,568,958 B2 * 2/2017 Mine ....................... G06F 1/169
(Continued)

*Primary Examiner* — Jordany Nunez
(74) *Attorney, Agent, or Firm* — JCIPRNET

(57) ABSTRACT

An electronic apparatus and an operating method of the electronic apparatus are provided. The electronic apparatus includes a display unit, a base, a touch pad and a processing unit. The base is coupled to the display unit. The touch pad is disposed on the base, includes touch areas and receives a touch action performed by the user on any touch area. The processing unit is coupled to the touch pad and sets a display frame of the display unit into display areas according to a position of each touch area, so that each touch area has the corresponding display area at a corresponding position on the display unit. After the touch pad received a first touch event, the processing unit obtains a first touch area where the first touch event is generated, and displays a first user interface in a first display area corresponding to the first touch area.

19 Claims, 14 Drawing Sheets

(56) References Cited

U.S. PATENT DOCUMENTS

| | | | | |
|---|---|---|---|---|
| 9,727,231 | B2* | 8/2017 | Miller | G06F 3/0488 |
| 9,996,242 | B2* | 6/2018 | Nishihashi | G06F 3/0488 |
| 2006/0279554 | A1* | 12/2006 | Shin | G06F 3/03547 |
| | | | | 345/173 |
| 2008/0036743 | A1* | 2/2008 | Westerman | G06F 3/038 |
| | | | | 345/173 |
| 2008/0266143 | A1* | 10/2008 | Ohshita | G06F 3/016 |
| | | | | 341/22 |
| 2010/0313156 | A1* | 12/2010 | Louch | G06F 3/0481 |
| | | | | 715/769 |
| 2010/0328236 | A1* | 12/2010 | Ma | G06F 3/038 |
| | | | | 345/173 |
| 2011/0113363 | A1* | 5/2011 | Hunt | G06F 3/0481 |
| | | | | 715/800 |
| 2012/0007823 | A1* | 1/2012 | Ozawa | G06F 3/0236 |
| | | | | 345/173 |
| 2012/0151412 | A1* | 6/2012 | Mine | G06F 1/169 |
| | | | | 715/810 |
| 2013/0120286 | A1 | 5/2013 | Mai et al. | |
| 2013/0321288 | A1* | 12/2013 | Adamson | G06F 3/041 |
| | | | | 345/173 |
| 2014/0083883 | A1* | 3/2014 | Elias | G06F 1/1626 |
| | | | | 206/320 |
| 2014/0198074 | A1 | 7/2014 | Wu | |
| 2016/0345048 | A1* | 11/2016 | Kim | G06F 3/0484 |

* cited by examiner

ELECTRONIC APPARATUS HAVING TOUCH PAD AND OPERATING METHOD OF ELECTRONIC APPARATUS

CROSS-REFERENCE TO RELATED APPLICATION

This application claims the priority benefit of Taiwan application serial no. 104116807, filed on May 26, 2015. The entirety of the above-mentioned patent application is hereby incorporated by reference herein and made a part of this specification.

BACKGROUND OF THE INVENTION

Field of the Invention

The invention relates to an electronic apparatus and an operating method thereof, and more particularly, to an electronic apparatus using a touch technology and an operating method thereof.

Description of Related Art

In recent years, with advancements in technology industry, electronic apparatuses, such as notebook computers (NB), tablet computers, and smart phones, have been widely used in daily life. Further, in order to improve convenience and practicality of the electronic apparatuses, the electronic apparatus uses the touch module as the input device instead of the traditional keyboard and mouse. And, with increases in use of touch panels, it has become an important research topic for person skilled in the art as how to integrate user experiences of both the touch panels and the touch modules together for making the operation of the electronic apparatuses more convenient.

SUMMARY OF THE INVENTION

The invention is directed to an electronic apparatus and an operating method thereof, capable of allowing users to control different user interfaces in corresponding display areas through multiple touch areas, so as to achieve a consistent user experience.

The electronic apparatus of the invention includes a display unit, a base, a touch pad and a processing unit. The base is coupled to the display unit. The touch pad is disposed on the base and extended from a first side to a second side of the base. The touch pad includes a plurality of touch areas, and receives a touch action performed by the user on any one of the touch areas. The processing unit is coupled to the touch pad. The processing unit sets a display frame of the display unit into a plurality of display areas according to a position where each of the touch areas is located in a longitudinal direction between the first side and the second side of the base, so that each of the touch areas has a corresponding one of the display areas at a corresponding position on the display unit. After a first touch event is received by the touch pad, the processing unit obtains a first touch area among the touch areas where the first touch event is generated, and the processing unit displays a first user interface in a first display area among the display areas corresponding to the first touch area.

In an operating method of an electronic apparatus according to the invention, the electronic apparatus has a display unit, a base and a touch pad. The operating method of the electronic apparatus includes the following. A touch action performed by a user is received through the touch pad, wherein the touch pad having a plurality of touch areas is disposed on the base, and the touch pad is extended from a first side to a second side of the base. A display frame of the display unit is set into a plurality of display areas according to a position where each of the touch areas is located in a longitudinal direction between the first side and the second side of the base, so that each of the touch areas has a corresponding one of the display areas at a corresponding position on the display unit. Further, after a first touch event is received by the touch pad, a first touch area among the touch areas where the first touch event is generated is obtained, and a first user interface is displayed in a first display area among the display areas corresponding to the first touch area.

Based on the above, the electronic apparatus is capable of dividing the touch pad into multiple touch areas, wherein each touch area is corresponding to one display area in the display unit, and each display area displays the corresponding user interface, such that the functions of the user interface may be controlled by operations in the corresponding touch area to achieve a consistent user experience.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
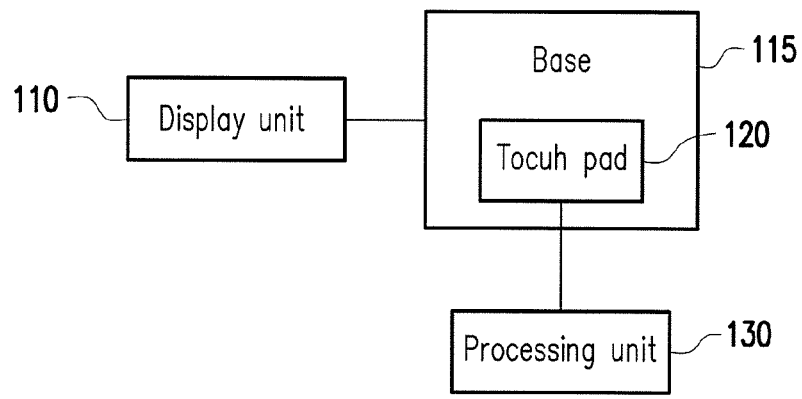
FIG. 1 is a block diagram illustrating an electronic apparatus according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

FIG. 1 is a block diagram illustrating an electronic apparatus according to a first embodiment of the invention. Referring to FIG. 1, an electronic apparatus 100 includes a display unit 110, a base 115, a touch pad 120 and a processing unit 130. The electronic apparatus 100 may be a notebook computer (NB), or a combination of a tablet computer and a base.

The display unit 110 may be a liquid crystal display module (LCM) or an organic light emitting diode (OLED) display module, but the invention is not limited thereto. The base 115 is coupled to the display unit 110.

The touch pad 120 is disposed on the base 115 and configured to serve as an input interface of the electronic apparatus 100. The touch pad 120 may be, for example, a resistance touch pad, a capacitive touch pad, a pressure-sensing touch pad, an optical touch pad, an ultrasonic touch pad, or may be composed of other sensing elements. Furthermore, the touch pad 120 may support multi-touch.

The processing unit 130 is coupled to the touch pad 120, and configured to determine a touch signal from the touch pad 120 and control a display frame corresponding to the display unit 110 according to the touch signal. In general, the touch signal may be generated through a touch action of a user; for example, the touch action is a single-tap, a double-tap, a long-press, a touch on a specific position, or a specific gesture trajectory on any touch area of the touch pad 120.

Figure 2:
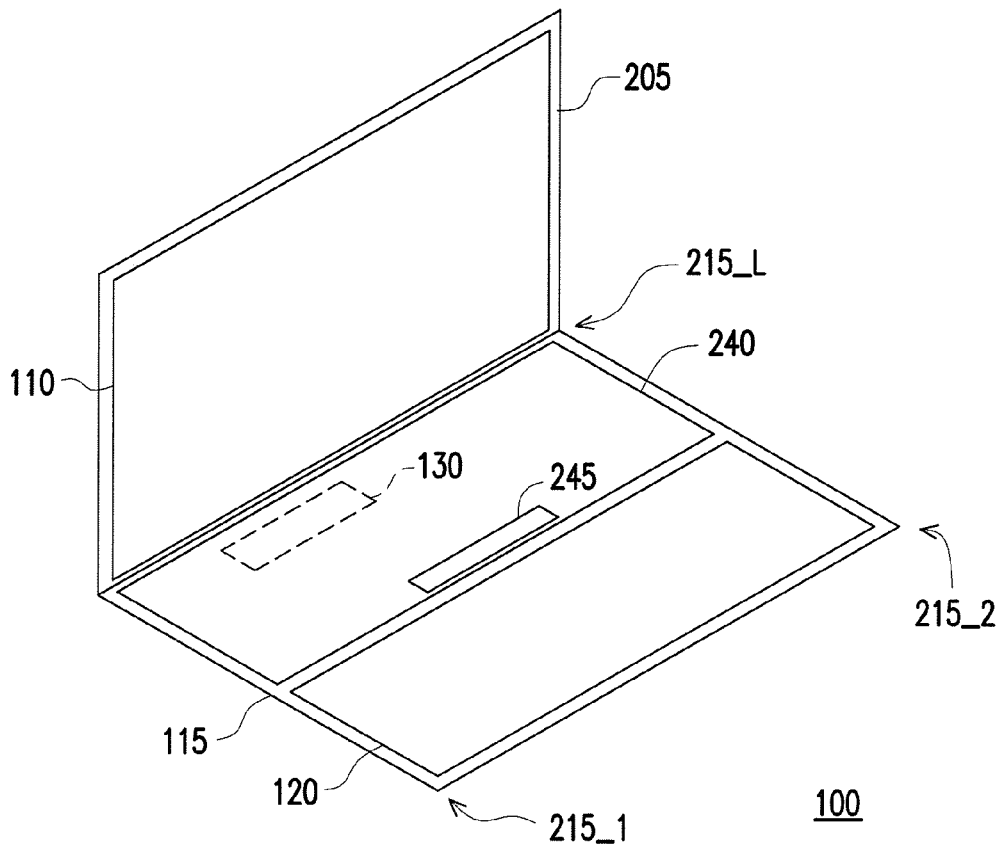
FIG. 2 is a schematic diagram illustrating the electronic apparatus according to the first embodiment of the invention.

FIG. 2 is a schematic diagram illustrating the electronic apparatus according to the first embodiment of the invention. In the present embodiment, the electronic apparatus 100 is, for example, the notebook computer which further includes an upper cover 205 and a keyboard 240. In the present embodiment, the upper cover 205 of the electronic apparatus 100 is pivoted to the base 115. The display unit 110 is disposed on the upper cover 205, and the touch pad 120 and the keyboard 240 are disposed on the base 115.

The touch pad 120 is a large-area touch device. The touch pad 120 may be disposed between a side 215_1 (a first side) and a side 215_2 (a second side) of the base 115. The touch pad 120 is one piece of pad (such as a single pad) which can be divided into a plurality of touch areas, and the touch pad 120 may receive the touch action performed by the user on any one of the touch areas. The touch pad 120 includes a ring circuit, and ring circuit surrounds the touch areas. It is worth mentioning that, the touch areas may be initially divided by firmware on the touch pad 120. Alternatively, the touch areas may also be divided by software, and the touch area where the touch action is generated may be determined according to a touch point coordinate reported by the touch pad 120.

Herein, the processing unit 130 is disposed inside the base 115 (represented by dash lines), and the processing unit 130 is coupled to the touch pad 120 and the keyboard 240. In another embodiment, the processing unit 130 may be disposed inside the upper cover 205 to receive the touch signal transmitted by the touch pad 120, but the position where the processing unit 130 is disposed is not particularly limited in the invention. The processing unit 130 may set a display frame of the display unit 110 into a plurality of display areas according to a position where each of the touch areas is located in a longitudinal direction between the first side 215_1 and the second side 215_2 of the base 115, so that each touch area has a corresponding one display area at a corresponding position on the display unit 110. The longitudinal direction between first side 215_1 and the second side 215_2 refers to a direction parallel to a length side 215_L of the base 115.

The keyboard 240 has a space key 245. In an embodiment, the touch pad 120 may be disposed between the first side 215_1 and the second side 215_2, and a length of the touch pad 120 is greater than a length of the space key 245.

An embodiment is provided below to describe division of the touch areas in more details.

Figure 3A:
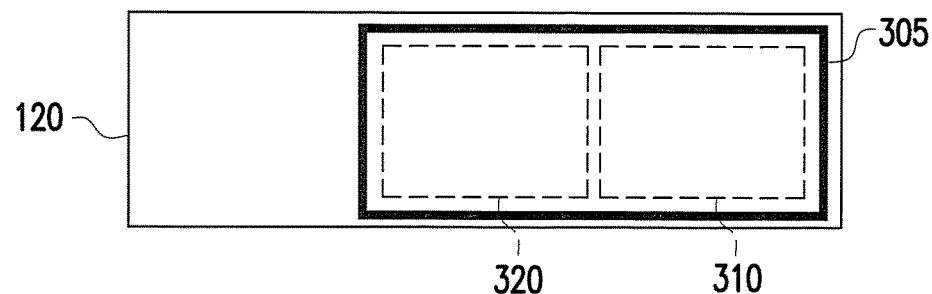
FIG. 3A and FIG. 3B are schematic diagrams illustrating the touch areas of the electronic apparatus according to the first embodiment of the invention.
Figure 3B:
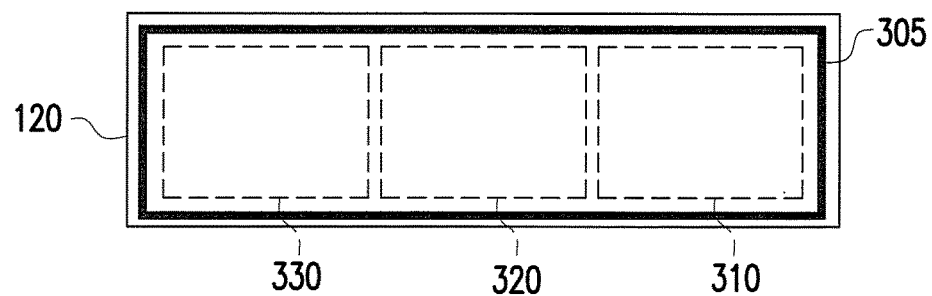

FIG. 3A and FIG. 3B are schematic diagrams illustrating the touch areas of the electronic apparatus according to the first embodiment of the invention. In FIG. 3A, the touch pad 120 may be divided into two touch areas including a touch area 310 and a touch area 320. Further, a ring circuit 305 surrounds the touch area 310 and the touch area 320 on a substrate of the touch pad 120.

In FIG. 3B, the touch pad 120 may be divided into three touch areas including a touch area 310, a touch area 320 and a touch area 330. Further, a ring circuit 305 surrounds the touch area 310, the touch area 320 and the touch area 330 on the substrate of the touch pad 120. Examples provided above are only illustrative, rather than limiting an amount, a dimension and a shape of the touch area.

An embodiment is provided below to describe how to set the display frame of the display unit 110 into multiple display areas according to the position of each of the touch areas, so that each of the touch areas has the corresponding display area at the corresponding position on the display unit 110.

Figure 4:
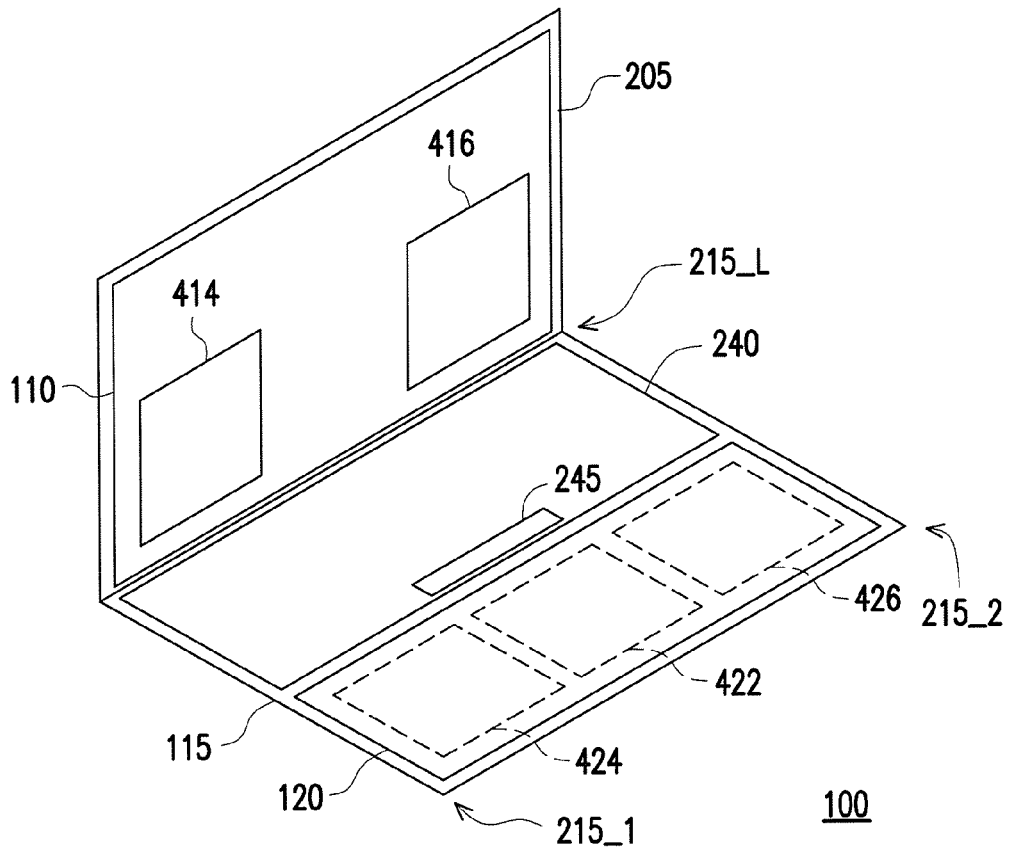
FIG. 4 is a schematic diagram illustrating correspondence relationships of the display areas and the touch areas according to the first embodiment of the invention.

FIG. 4 is a schematic diagram illustrating correspondence relationships of the display areas and the touch areas according to the first embodiment of the invention. Referring to FIG. 4, the touch pad 120 of the electronic apparatus 100 is divided into three touch areas including a touch area 422, a touch area 424 and a touch area 426. In the present embodiment, the touch area 422 located at a center of the touch pad 120 is configured to control entire display range of the display unit 110.

The processing unit 130 may set the display frame of the display unit 110 into the display areas according to the position where each of the touch areas is located in the longitudinal direction between the first side 215_1 and the second side 215_2 of the base 115. Specifically, the processing unit 130 may set the display area 414 on the display frame of the display unit 110 according to the position where the touch area 424 is located in the longitudinal direction of the base 115, so that the touch area 424 has the corresponding display area 414 at the corresponding position on the display unit 110. Also, the processing unit 130 may set the display area 416 on the display frame of the display unit 110 according to the position where the touch area 426 is located in the longitudinal direction of the base 115, so that the touch area 426 has the corresponding display area 416 at the corresponding position on the display unit 110.

Specifically, the lengths of each touch area and the corresponding display area are proportional or identical to each other in the longitudinal direction of the base 115, and each of the touch areas is not overlapped with one another. For example, the lengths of the touch area 424 and the display area 414 are proportional or identical to each other in the longitudinal direction of the base 115. In addition, a coordinate of each of the touch areas is mapped to a coordinate of the corresponding display area. For example, a coordinate of the touch area 424 is mapped to a coordinate of the display area 414, and a coordinate of the touch area 426 is mapped to a coordinate of the display area 416.

It should be noted that, a multi-area touch function of the electronic apparatus 100 is enabled through a specific approach. The multi-area touch function is used to divide the touch pad 120 into multiple touch areas. The multi-area touch function of the electronic apparatus 100 is initially set to a disabled state. The processing unit 130 only enables the multi-area touch function after a first trigger signal is received by the processing unit 130; and in the case where the multi-area touch function is already in an enabled state, the processing unit 130 disables the multi-area touch function after a second trigger signal is received.

For example, the first trigger signal is provided by the keyboard 240 to enable the multi-area touch function. The first trigger signal is, for example, generated by a physical key on the keyboard 240 pressed by the user, or generated by a specific combination of keys on the keyboard 240 pressed by the user. When the first trigger signal is received through the keyboard 240, the processing unit 130 enables the multi-area touch function. Take FIG. 4 as an example, the processing unit 130 divides the touch pad 120 into the touch areas 422, 424 and 426 according to a predetermined rule, and sets the display frame of the display unit 110 into the display areas 414 and 416 according to the positions of the touch areas 422 and 426 located in the longitudinal direction between the first side 215_1 and the second side 215_2 of the base 115, so that the touch areas 422 and 426 have the corresponding display areas 414 and 416 respectively at the corresponding positions on the display unit 110. In the case where the multi-area touch function is enabled, when the second trigger signal is received through the keyboard 240, the processing unit 130 disables the multi-area touch function.

The first trigger signal is generated by a function key F1 of the keyboard 240, for example, and the second trigger signal is generated by a function key F2 of the keyboard 240, for example. Alternatively, the first trigger signal is generated by a combination of function keys Fn+F1 of the keyboard 240, for example, and the second trigger signal is generated by a combination of function keys Fn+F2 of the keyboard 240, for example. In addition, the first trigger signal and the second trigger signal may also be set to be generated by the same function key (or the same combination of function keys). For example, in the state where the multi-area touch function is disabled, a signal generated by pressing the function key F1 is the first trigger signal for enabling the multi-area touch function; whereas in the state where the multi-area touch function is enabled, the signal generated by pressing the function key F1 is the second trigger signal for disabling the multi-area touch function.

Further, the multi-area touch function may also be enabled or disabled through functional options in an application program. Also, before the multi-area touch function is enabled, the whole area of the touch pad 120 is used to provide the touch function (no areas are divided for the touch pad 120). In general, when the multi-area touch function is enabled, the touch pad 120 may be divided into the touch areas, and the display areas are set in correspondence to the touch areas. When the multi-area touch function is disabled, the correspondence relationships of all the touch areas and the corresponding display areas are canceled. In addition, when the multi-area touch function is enabled, one or more user interfaces controllable by all the touch areas may be displayed.

In another embodiment, when the multi-area touch function is enabled, all of the user interfaces controllable by the touch areas are not displayed until a specific touch action performed by the user on any one of the touch areas is received by the touch pad 120. For example, said user interface is only displayed in the corresponding display area on the display unit 110 when any one of the touch areas is activated or waked up to control the user interface by using, the single-tap, the double-tap, the long-press, the touch on the specific position, the specific gesture trajectory, or the specific trigger signal generated by the keyboard 240, or the options in the application program.

Specifically, after a touch action (a first touch event) performed by the user on any one of the touch areas is received by the touch pad 120, the processing unit 130 may obtain the touch area (a first touch area) where the first touch event is generated, and the processing unit 130 may then display the user interface (a first user interface) on the corresponding display area (a first display area) corresponding to the first touch area.

When the first user interface is displayed in the first display area by the display unit 110, the processing unit 130 may control operations of functions included by the first user interface according to the touch action performed by the user in the first touch area and received by the touch pad 120. Herein, the user interface may be a functional interface or a functional menu (e.g., a handwriting functional interface or a multimedia interface menu) which are provided by the application program. The user interface may also be an interface of an application program (e.g., a word processing program or a multimedia player program) in an operating system operated by the electronic apparatus 100.

Further, the user may also turn off or suspend the touch area in order to stop or pause controlling the user interface. For example, when a touch action (which is different from the first touch event) performed by the user on any one of the touch areas is received by the touch pad 120, or when a specific trigger signal is generated by using the keyboard 240, or when a software option of the application program is selected, or after waiting for a predetermined time, the touch area is turned off or suspended and the user interface and the corresponding display area are disappeared from the display unit 110.

In addition, the user may also switch between the touch areas to select and control the display area to be displayed on a top layer of the display frame of the display unit 110 or make the display area disappear from the display unit 110 by performing the specific touch action on any one of the touch areas, or using the keyboard 240 to generate the specific trigger signal, or using the software option of the application program.

Figure 5:
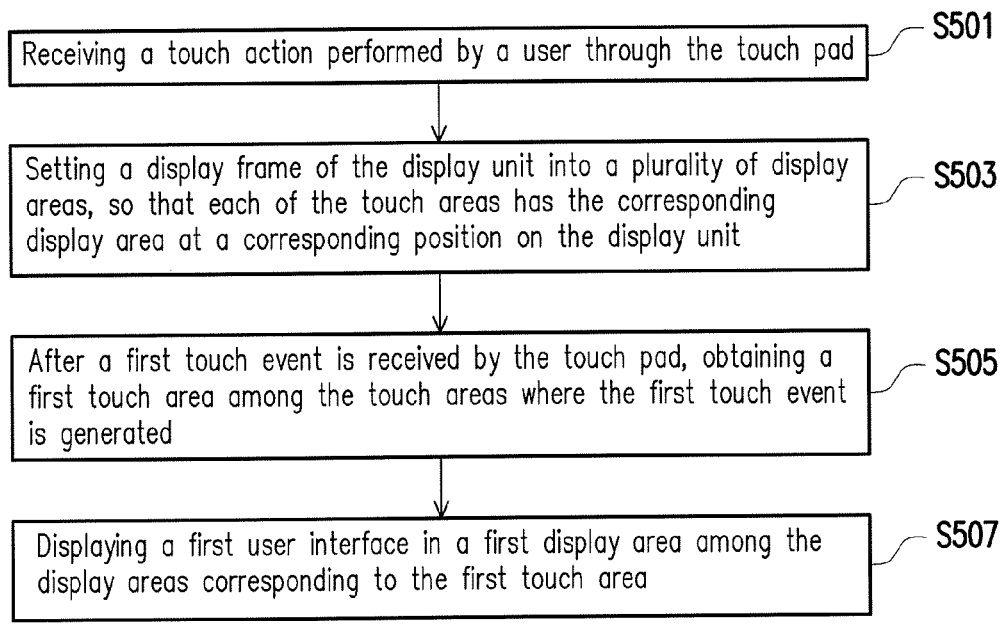
FIG. 5 is a flowchart illustrating an operating method of an electronic apparatus according to the first embodiment of the invention.

FIG. 5 is a flowchart illustrating an operating method of an electronic apparatus according to the first embodiment of the invention. Referring to FIG. 4 and FIG. 5. First of all, in step S501, the processing unit 130 receives a touch action performed by a user through the touch pad 120. For example, the touch action may be generated on any touch area of the touch pad 120 (the first touch event) by using the single-tap, the double-tap, the long-press, the touch on the specific position, or the specific gesture trajectory.

In step S503, the processing unit 130 may set a display frame of the display unit 110 into a plurality of display areas according to a position of each of the touch areas, so that each of the touch areas has a corresponding display area at a corresponding position on the display unit 110. For example, in view of FIG. 4, the processing unit 130 sets the display area 414 according to the touch area 424, and the touch area 424 is corresponding to the display area 414. Also, the processing unit 130 sets the display area 416 according to the touch area 426, and the touch area 426 is corresponding to the display area 416. In FIG. 4, the touch area 422 located at center of the touch pad 120 is configured to control entire display range of the display unit 110. In other embodiments, the processing unit 130 may also set the display areas between the display areas 414 and 416 according to the position of the touch area 422. It should be noted that, an order of step S501 and step S503 may be reversed.

In step S505, after a first touch event is received by the touch pad 120, the processing unit 130 obtains a first touch area where the first touch event is generated. In general, the touch pad 120 may determine the touch area where the touch event is generated according to the position where the touch event occurs, and transmits a result thereof to the processing unit 130. In addition, the touch pad 120 may also transmit the position of the touch event (e.g., a coordinate value) to the processing unit 130, so that the first touch area where the first touch event occurs may be determined by the processing unit 130.

Lastly, in step S507, the processing unit 130 displays a first user interface in a first display area corresponding to the first touch area. Hereinafter, description is provided below by taking the first touch area as the touch area 424 for example. The processing unit 130 displays a user interface in the display area 414 corresponding to the touch area 424.

Hereinafter, the user interface controlled by the touch area 424 may be a multimedia function player interface or a handwriting function interface which are predetermined by the user or a supplier of the electronic apparatus 100. Further, the user interface controlled by the touch area 424 may also be predefined as a functional interface for a specific tool in graphic software. Moreover, the user interface controlled by the touch area 424 may also be customized by the user through the application program. For example, the user may choose the user interface to be controlled by the display area 424 by a list, or functional options of the user interface mapped to the touch area 424. The touch area 426 may also be deduced by analogy.

Specifically, the processing unit 130 may control operations of the first user interface according to the touch action performed by the user in the first touch area and received by the touch pad 120. Another embodiment is given for illustration below.

Second Embodiment

Figure 6:
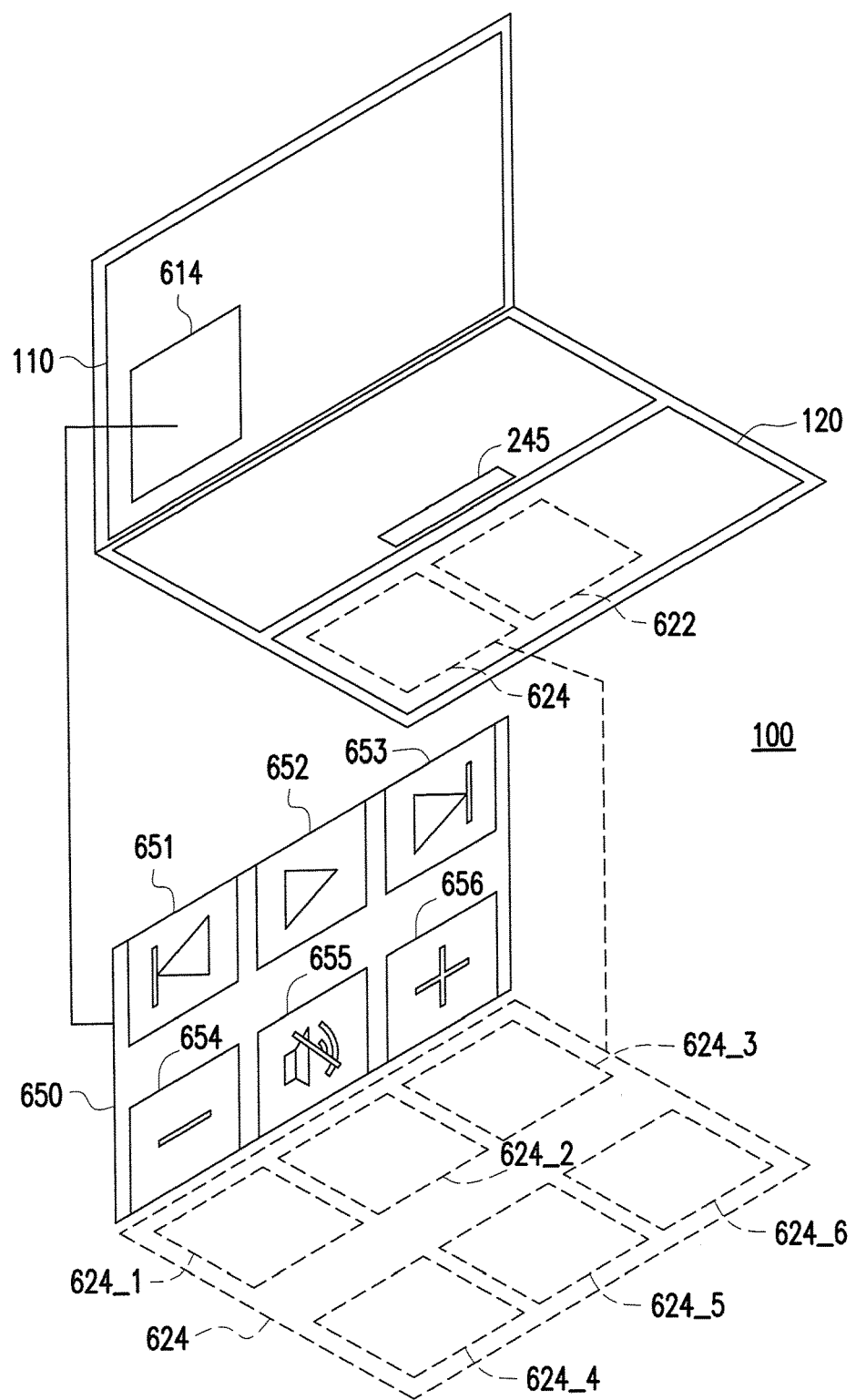
FIG. 6 is a schematic diagram illustrating an operating method of an electronic apparatus according to a second embodiment of the invention.

FIG. 6 is a schematic diagram illustrating an operating method of an electronic apparatus according to the second embodiment of the invention. Referring to FIG. 6, the touch pad 120 of the electronic apparatus 100 is divided into a touch area 622 and a touch area 624. In the present embodiment, a user interface corresponding to the touch area 624 is a multimedia functional interface 650. The multimedia functional interface 650 includes a plurality of operating functions 651 to 656. For example, the operating function 651 is a reverse function, the operating function 652 is a play function, the operating function 653 is a forward function, the operating function 654 is a volume-down function, the operating function 655 is a mute function, and the operating function 656 is a volume-up function.

In the present embodiment, it is assumed that the user intends to activate the multimedia functional interface 650 in order to execute the play function. First, after a touch action performed by the user on the touch area 624 (the first touch event) is received by the touch pad 120, the processing unit 130 may learn or knows that the first touch event occurs in the touch area 624. Next, the processing unit 130 may set a display area 614 corresponding to the touch area 624 on the display unit 110, and display the multimedia functional interface 650 in the display area 614. In the present embodiment, the touch area 624 may further be divided into touch areas 624_1 to 624_6, so that the touch areas 624_1 to 624_6 are corresponding to the operating functions 651 to 656 respectively.

The operating function 652 is used as an example below. When the user performs the touch action on the touch area 642_2, the processing unit 130 receives the information that the touch event occurs in the touch area 624_2 which is corresponding to the operating function 652, so as to play the multimedia. The rest of the operating functions 651 and 653 to 656 may also be deduced by analogy. Accordingly, the user may operate the user interface intuitively.

Further, when the first user interface is displayed in the first display area, if a touch area (a second touch area) where a touch event (a second touch event) is generated being different from the first touch area is obtained by the processing unit 130, the processing unit 130 may display a second user interface on a display area (a second display area) corresponding to the second touch area. Further, the second user interface is different from the first user interface.

Specifically, when the touch pad 120 is divided into the touch areas, each of the areas controls a different user interface, and the user interfaces may be correspondingly displayed in the display area of the display unit 110. These user interfaces may be displayed at the same time for the user to control. An embodiment is given for illustration below.

Third Embodiment

Figure 7:
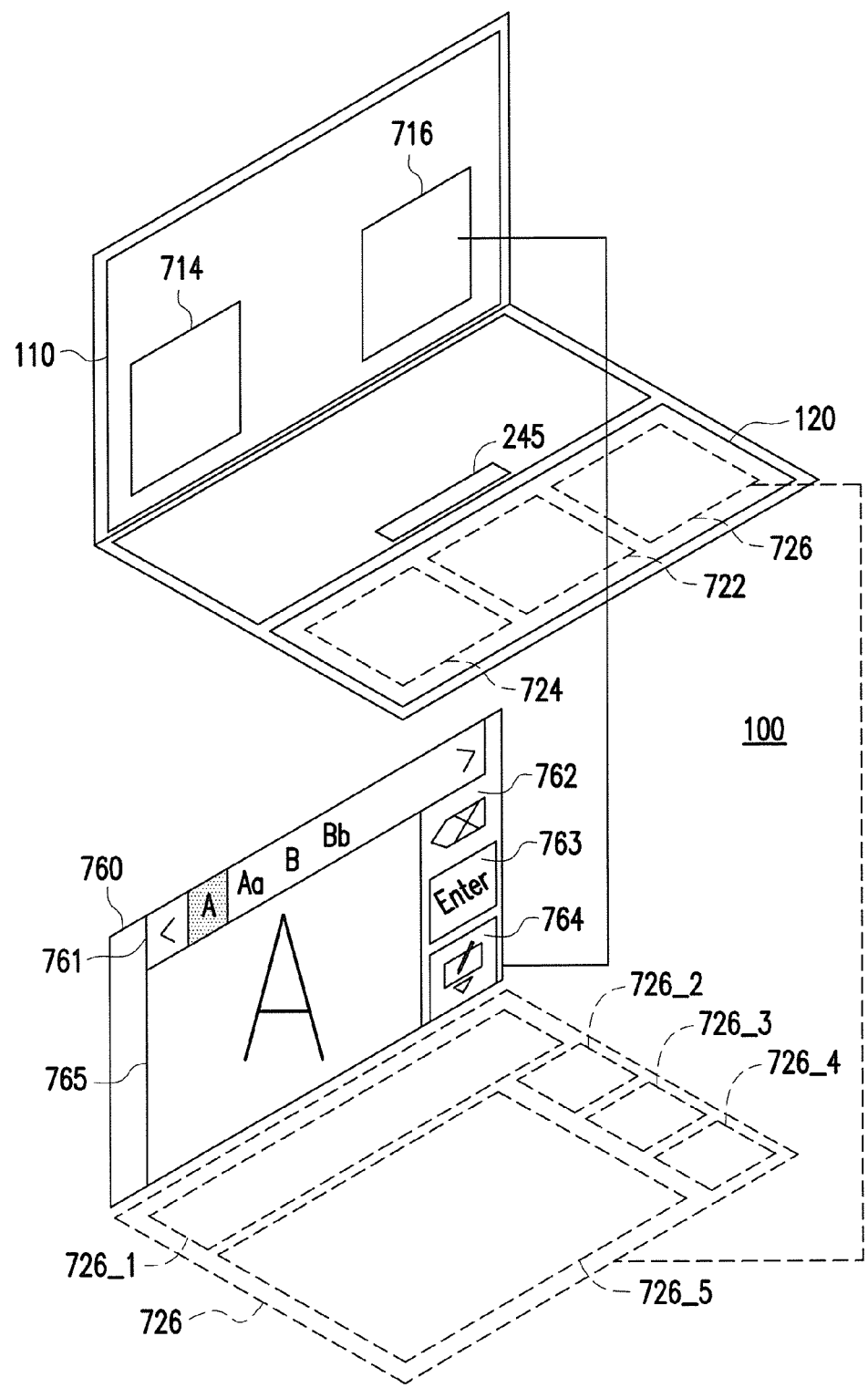
FIG. 7 is a schematic diagram illustrating an operating method of an electronic apparatus according to a third embodiment of the invention.

FIG. 7 is a schematic diagram illustrating an operating method of an electronic apparatus according to a third embodiment of the invention. Referring to FIG. 7, the touch pad 120 of the electronic apparatus 100 is divided into a touch area 722, a touch area 724 and a touch area 726. In the present embodiment, the touch area 722 controls the entire range of the display unit 110; and the touch areas 724 and 726 control user interfaces respectively displayed in corresponding display areas 714 and 716.

In the present embodiment, it is assumed that one user interface (e.g., the multimedia functional interface 650 as shown by FIG. 6) is already displayed in the display area 714. The touch area 726 is configured to control a handwriting functional interface 760, but the handwriting functional interface 760 is not displayed on the display unit 110 yet. Specifically, when the user interface is already displayed in the display area 714, if the touch event obtained by the processing unit 130 is generated in the touch area 726, because the touch area 726 is different from the touch area 724 corresponding to the display area 714, the processing unit 130 may display the handwriting functional interface 760 in the display area 716 corresponding to the touch area 726. In the present embodiment, the user interfaces corresponding to the display areas 714 and 716 may be displayed on the display unit 110 at the same time by, for example, displaying both the user interfaces according to their triggering precedence.

Alternatively, one of the user interfaces corresponding to the display areas 714 and 716 may also be displayed according to their triggering precedence before hiding another one of the user interfaces. For example, when the user interface (e.g., the multimedia functional interface 650 as shown by FIG. 6) is already displayed in the display area 714, if the touch event obtained by the processing unit 130 is generated in the touch area 726, because the touch area 726 is different from the touch area 724 corresponding to the display area 714, after displaying the handwriting functional interface 760 in the display area 716, the processing unit 130 may hide the user interface which is already displayed in the display area 714.

In the present embodiment, the handwriting functional interface 760 includes operating functions 761 to 765. The touch area 726 may further be divided into touch areas 726_1 to 726_5 according to the operating functions 761 to 765 of the handwriting functional interface 760, so that the touch areas 726_1 to 726_5 are corresponding to the operating functions 761 to 765 respectively. Herein, the operating function 761 is a suggested-word-list function, the operating function 762 is a delete-and-cancel function, the operating function 763 is a confirm function, the operating function 764 is an input-method-switching function and the operating function 765 is a text recognition function. In response to the touch action performed by the user in respective one of the touch areas 726_1 to 726_5, the processing unit 130 may correspondingly perform corresponding one of the operating functions 761 to 765.

Further, the operating functions may also be controlled by touching each position with different gesture trajectories which are customized by the user or preset by the supplier of the electronic apparatus 100.

For example, FIG. 6, the touch area 624 controls the multimedia functional interface 650. The user may perform a single-tap gesture on the touch areas 624_1 and 624_3 to correspondingly control the operating functions 651 and 653 of the multimedia functional interface 650. A double-tap gesture may be performed on the touch areas 624_5 to correspondingly control the operating function 655 of the multimedia functional interface 650. Further, a long-press gesture may be performed on the touch areas 624_4 and 624_6 to correspondingly control the operating functions 654 and 656 of the multimedia functional interface 650.

As another example, in FIG. 7, the touch area 726 controls the handwriting functional interface 760. The user may perform a sliding gesture on the touch area 726_1 to correspondingly control the operating function 761 of the handwriting functional interface 760. A single-tap gesture is performed on the touch area 726_2 and 726_3 to correspondingly control the operating functions 762 and 763 of the handwriting functional interface 760. A single-tap gesture may be performed on the touch areas 726_4 to correspondingly control the operating function 764 of the multimedia functional interface 760. Further, a continuous handwriting trajectory may be created on the touch area 726_5 to correspondingly control the operating function 765 of the multimedia functional interface 760. Accordingly, the user may operate the user interface intuitively.

It should be noted that, because the positions are visually related in the foregoing embodiments, so that the user may intuitively operate the user interfaces. Other than that, the touch areas may be printed with meaningful graphical indicators, or the touch areas may be marked by different colors, or the touch areas may be made by using different materials having different surface irregularities to provide different tactile changes, so that the user may determine the positions corresponding to the functions in the user interface more easily.

In addition, the touch areas may also be mapped to one of the functions in the user interface, and the touch area may also be changed according to a dimension of a mapped target to adjust mapping range and manner. Specifically, the user interface may be an interface of a multimedia player, and an operating range of the touch area can correspondingly control a time bar of the multimedia player. When a dimension of the interface of the multimedia player is changed, the operating range of the touch area is correspondingly changed. An embodiment is given for illustration below.

Fourth Embodiment

Figure 8A:
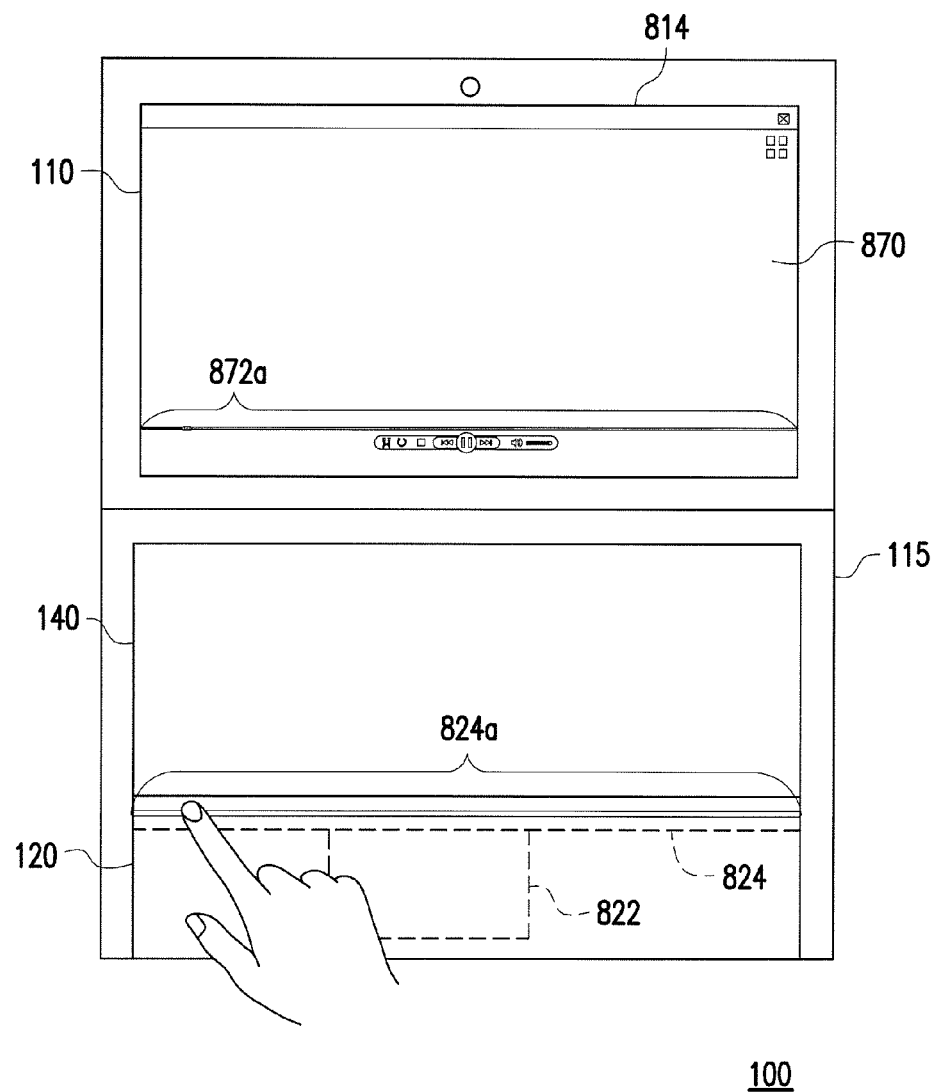
FIG. 8A and FIG. 8B are a schematic diagram illustrating an operating method of an electronic apparatus according to a fourth embodiment of the invention.
Figure 8B:
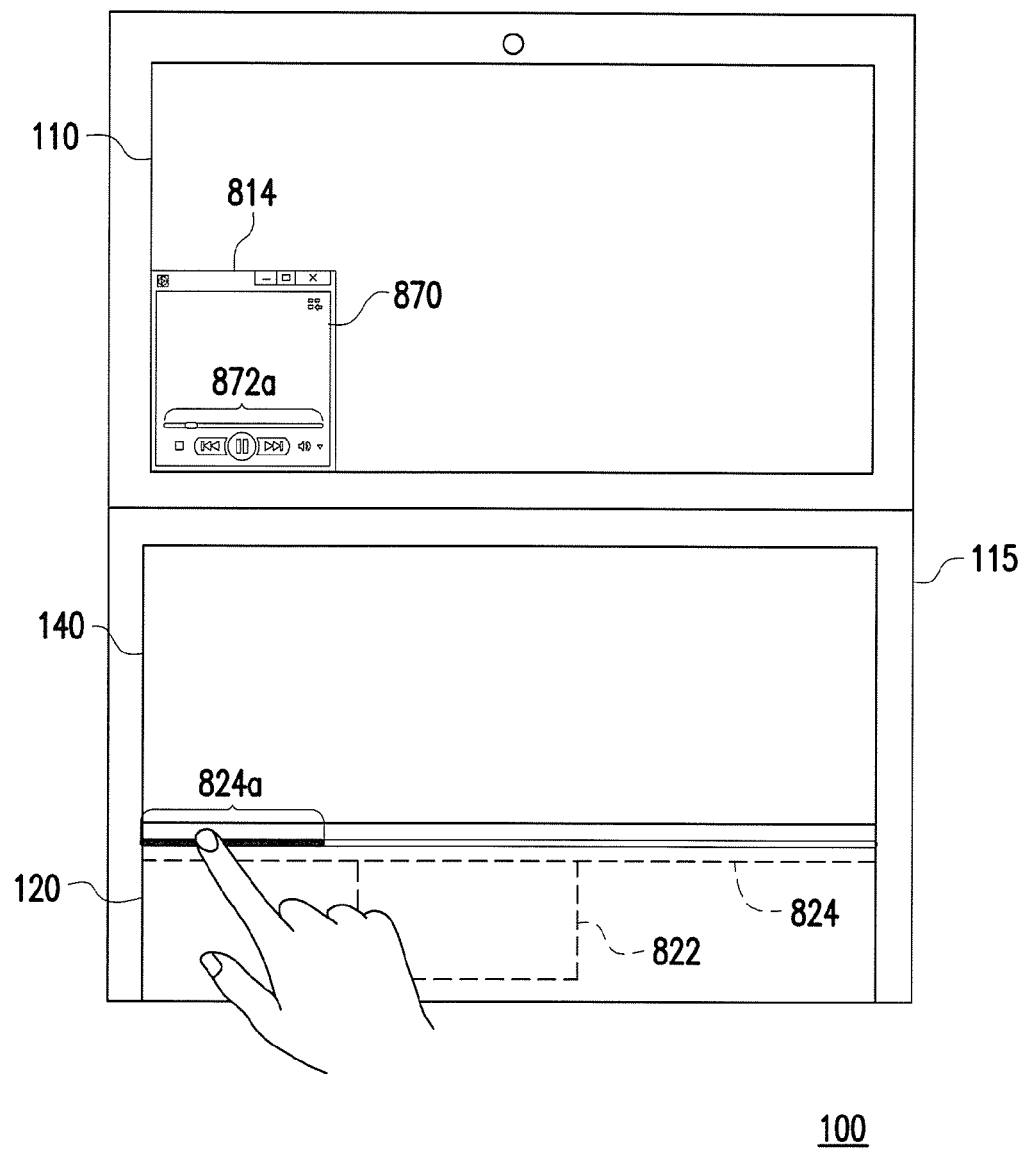

FIG. 8A and FIG. 8B are a schematic diagram illustrating an operating method of an electronic apparatus according to a fourth embodiment of the invention. Referring to FIG. 8A, the touch pad 120 of the electronic apparatus 100 is divided into a touch area 822 and a touch area 824. The touch area 822 controls the entire range of the display unit 110.

The touch area 824 correspondingly controls an interface 870 of a multimedia player. After a touch action performed by the user on the touch area 824 (the first touch event) is received by the touch pad 120, the processing unit 130 knows that the first touch event occurred in the touch area 824, and displays the interface 870 of the multimedia player in a display area 814 corresponding to the touch area 824. Further, an operating range 824a of the touch area 824 can correspondingly control a time bar 872a of the interface 870 of the multimedia player.

Referring to FIG. 8B, when a dimension of the interface 870 of the multimedia player is changed, the time bar 872a of the interface 870 of the multimedia player is correspondingly changed. The processing unit 130 may correspondingly change the operating range 824a of the touch area 824 (e.g., changing from FIG. 8A to FIG. 8B). Accordingly, the user may operate the user interface more intuitively.

In addition, at least one sensing element may be further disposed on the electronic apparatus, so that the corresponding display area to be controlled may be placed according to a position where the sensing element is disposed (e.g., disposed in manners of left-to-left, top-to-top, bottom-to-bottom, etc.). As a result, the user is able to complete gesture operations more intuitively. Details are provided below with reference to the following embodiments.

Fifth Embodiment

Figure 9:
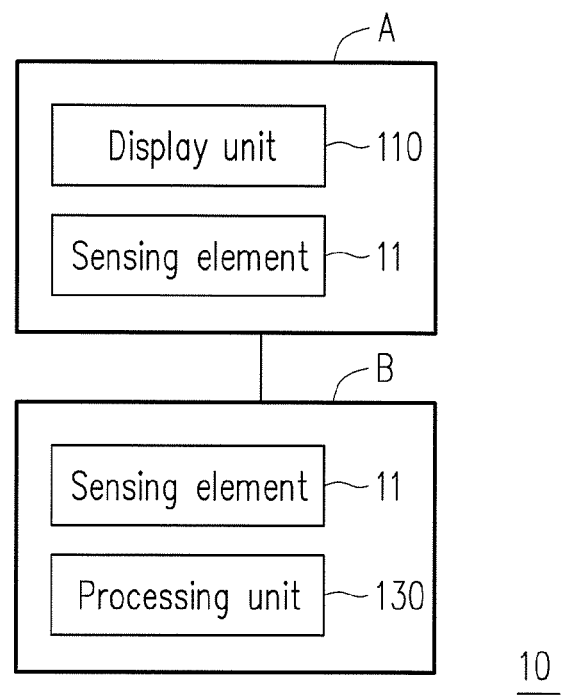
FIG. 9 is a block diagram illustrating an electronic apparatus according to a fifth embodiment of the invention.

FIG. 9 is a block diagram illustrating an electronic apparatus according to a fifth embodiment of the invention. Referring to FIG. 9, an electronic apparatus 10 is, for example, the notebook computer. The electronic apparatus 10 includes an upper cover A, a base B and a sensing element 11. The upper cover A is disposed with the display unit 110. The base B is pivoted to the upper cover A and disposed with the processing unit 130. The sensing element 11 is disposed on a side of at least one of the upper cover A and the base B, and configured to sense the touch action. Further, the sensing element 11 is coupled to the processor circuit 130. For example, the sensing element 11 may also be disposed on only one of the upper cover A or the base B, or the sensing element 11 may also be disposed on both the upper cover A and the base B. The sensing element 11 may be, for example, a resistance touch pad, a capacitive touch pad, a pressure-sensing touch pad, an optical touch pad, an ultrasonic touch pad and so on.

The processing unit 130 controls the corresponding display area on the display unit 110 according to a touch action sensed by the sensing element 11, wherein a position of the corresponding display area is corresponding to a position where the sensing element 11 is disposed on the at least one of the upper cover A and the base B.

Figure 10:
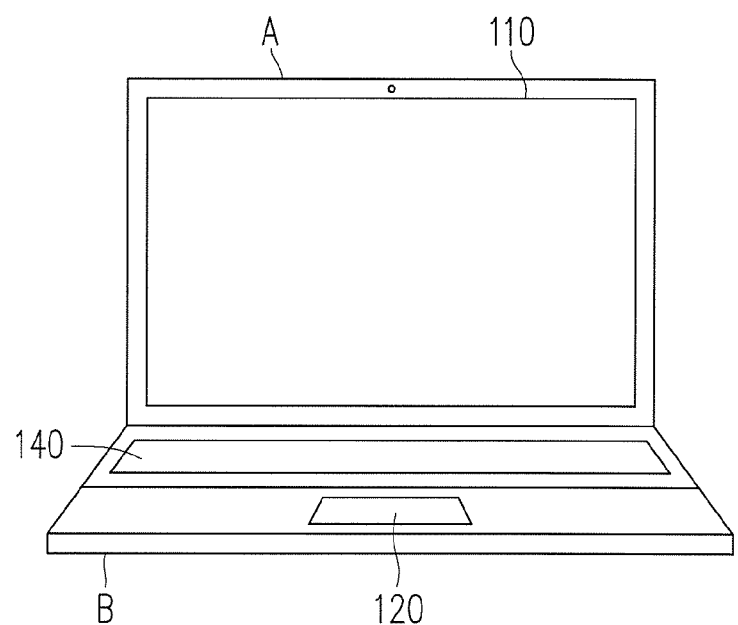
FIG. 10 is a schematic exterior diagram of the electronic apparatus according to the fifth embodiment of the invention.

For instance, FIG. 10 is a schematic exterior diagram of the electronic apparatus according to the fifth embodiment of the invention. The upper cover A of an electronic apparatus 10 is pivoted to the base B. The display unit 110 is disposed on the upper cover A. The processing unit 130 is disposed inside the base B, and the touch pad 120 and a keyboard 140 are disposed on the exterior of the base B. The processing unit 130 is coupled to the touch pad 120 and the keyboard 140. The touch pad 120 is a large-area touch device as well as a piece of pad. The user may use the touch pad 120 to perform a touch action with higher complexity, and use the sensing element 11 to perform a simpler touch action.

Figure 11A:
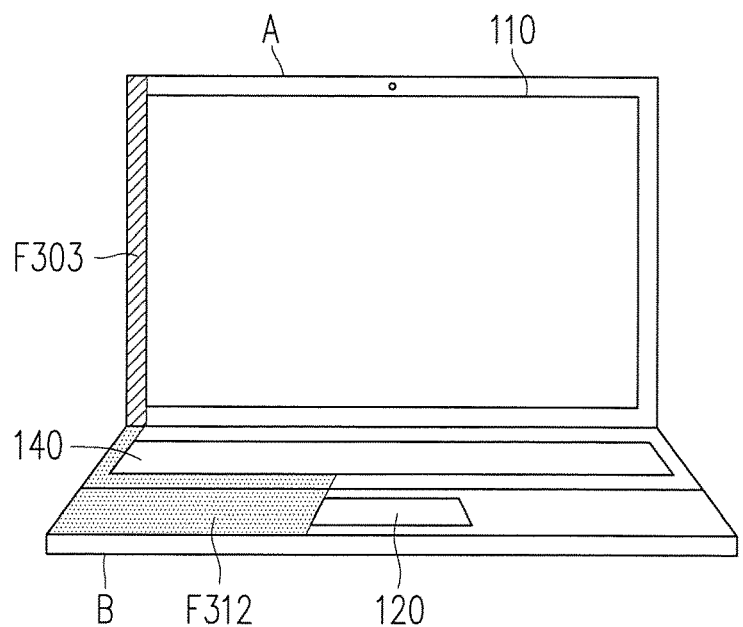
FIG. 11A to FIG. 11C are schematic diagrams illustrating positions where the sensing element is disposed according to the fifth embodiment of the invention.
Figure 11B:
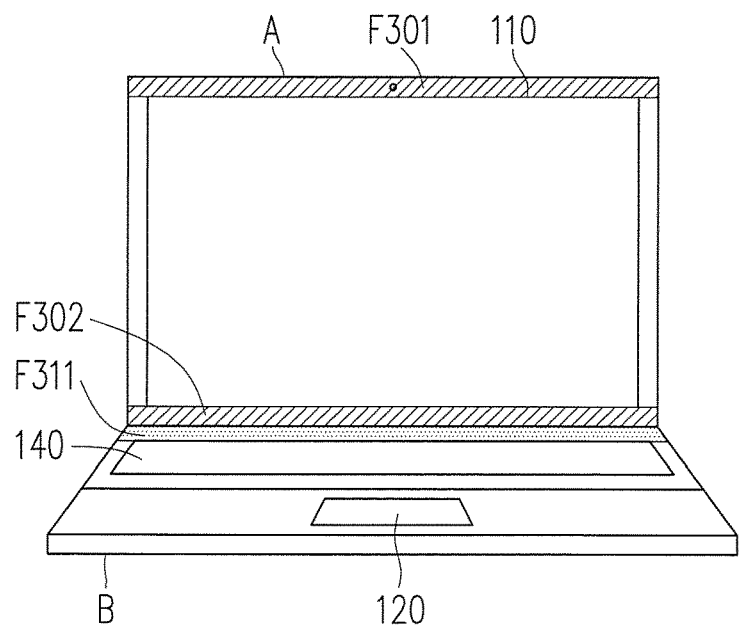
Figure 11C:
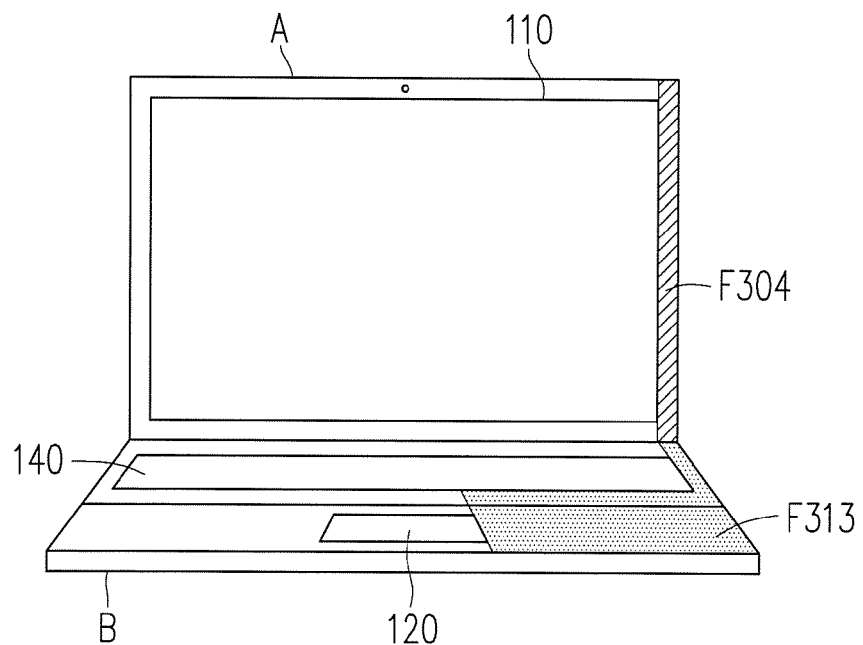

Examples are provided below to describe the position where the sensing element 11 is disposed. FIG. 11A to FIG. 11C are schematic diagrams illustrating positions where the sensing element is disposed according to the fifth embodiment of the invention. Referring to FIG. 11A to FIG. 11C together, the upper cover A is disposed with a top frame border F301, a bottom frame border F302, a left frame border F303 and a right frame border F304. The top frame border F301, the bottom frame border F302, the left frame border F303 and the right frame border F304 are disposed on four directions (top, bottom, left and right) of the display unit 110, respectively.

Among areas other than where the keyboard 140 and the touch pad 120 are disposed on the base B, a first area F311, a second area F312 and a third area F313 are further divided. The first area F311 shown by FIG. 11B is located at top of the keyboard 140. The second area F312 shown by FIG. 11A is located at left of the keyboard 140 and the touch pad 120. The third area F313 shown by FIG. 11C is located at right of the keyboard 140 and the touch pad 120.

Depending on different situations, the sensing element 11 may be disposed on at least one selected from the top frame border F301, the bottom frame border F302, the left frame border F303 and the right frame border F304 of the upper cover A and the first area F311, the second area F312 and the third area F313 of the base B, or a combination of the above. Accordingly, the corresponding display area on the display unit 110 may be controlled according to the touch action sensed by the sensing element 11.

Figure 12A:
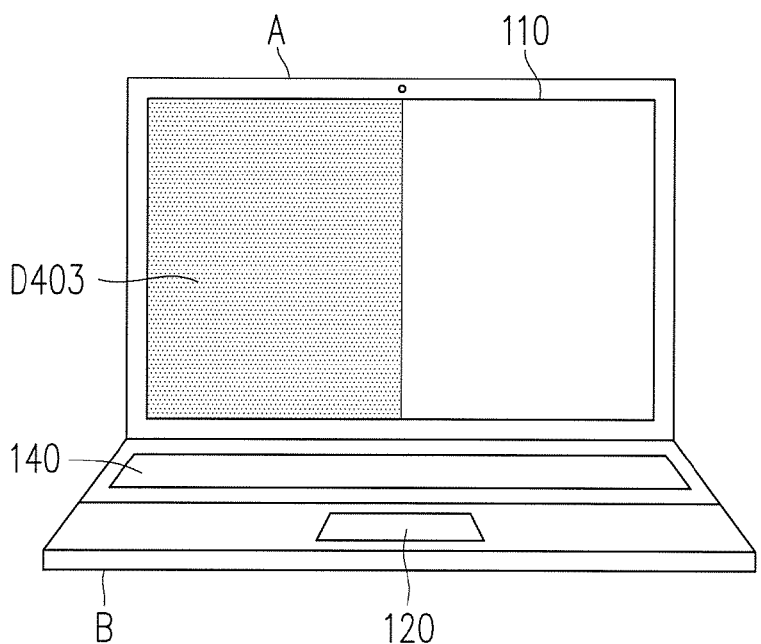
FIG. 12A to FIG. 12C are schematic diagrams illustrating display areas corresponding to the positions where the sensing element is disposed according to the fifth embodiment of the invention.
Figure 12B:
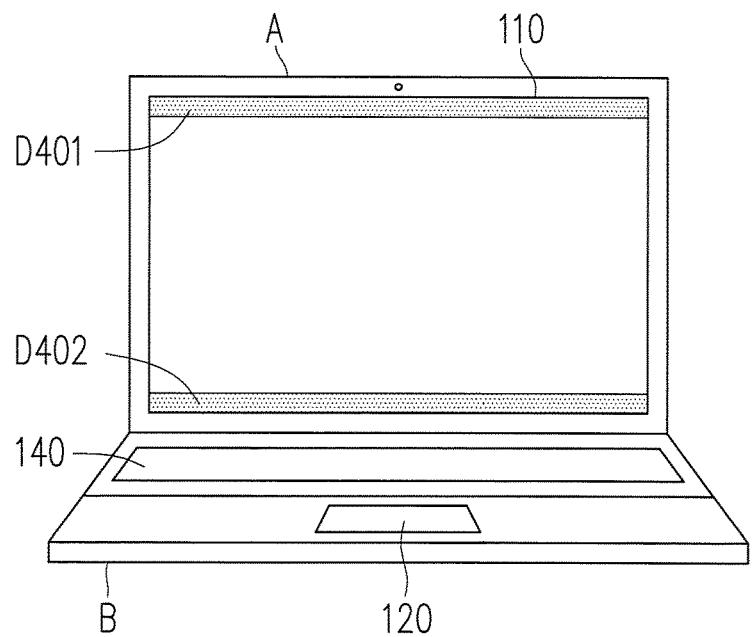
Figure 12C:
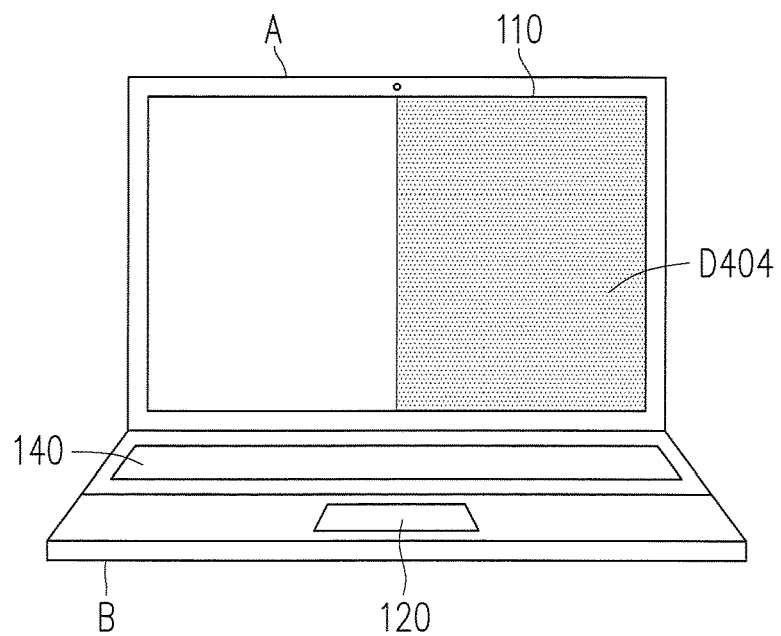

FIG. 12A to FIG. 12C are schematic diagrams illustrating display areas corresponding to the positions where the sensing element is disposed according to the first embodiment of the invention. Referring to FIG. 11A to FIG. 11C and FIG. 12A to FIG. 12C together, details are provided below with reference to the areas where the sensing element 11 may be disposed to describe the corresponding display area to be controlled.

When the sensing element 11 is disposed on the upper cover A and located on the top frame border F301 of the display unit 110, the corresponding display area to be controlled is located on a top edge area D401 of the display frame (as shown by FIG. 12B). When the sensing element 11 is disposed on the upper cover A and located on the bottom frame border F302 of the display unit 110, the corresponding display area to be controlled is located on a bottom edge area D402 of the display frame (as shown by FIG. 12B).

When the sensing element 11 is disposed on the upper cover A and located on the left frame border F303 of the display unit 110, the corresponding display area to be controlled is located on a left side area D403 of the display frame (as shown by FIG. 12A). When the sensing element 11 is disposed on the upper cover A and located on the right frame border F304 of the display unit 110, the corresponding display area to be controlled is located on a right side area D404 of the display frame (as shown by FIG. 12C).

When the sensing element 11 is disposed on the base B and located on the first area F311 above the keyboard 140, the corresponding display area to be controlled is located on the top edge area D401 or the bottom edge area D402 of the display frame (as shown by FIG. 12B).

When the sensing element 11 is disposed on the base B and located on the second area F312 at left of the keyboard 140 and the touch pad 120, the corresponding display area to be controlled is located on the left side area D403 of the display frame (as shown by FIG. 12A). When the sensing element 11 is disposed on the base B and located on the third area F313 at right of the keyboard 140 and the touch pad 120, the corresponding display area to be controlled is located on the right side area D404 of the display frame (as shown by FIG. 12C).

Dimensions of the top edge area D401 and the bottom edge area D402 of the display frame, the left side area D403 of the display frame and the right side area D404 of the display frame may be decided based on different situations. For example, a size of the corresponding display area to be controlled may be determined according to configurations of user interfaces provided by an application program.

In addition, the electronic apparatus 10 may further be set as follows. After receiving an interaction trigger signal, the processing unit 130 determines the display area to be controlled based on a position where the sensing element 11 is disposed. For example, if the sensing element 11 is disposed on the positions shown by FIG. 11A, after receiving the interaction trigger signal, the processing unit 130 determines that the display area to be controlled is the left side area D403 of the display frame as shown by FIG. 12A. If the sensing element 11 is disposed on the positions shown by FIG. 11B, after receiving the interaction trigger signal, the processing unit 130 determines that the display area to be controlled is the top edge area D401 and the bottom edge area D402 of the display frame as shown by FIG. 12B. If the sensing element 11 is disposed on the positions shown by FIG. 11C, after receiving the interaction trigger signal, the processing unit 130 determines that the display area to be controlled is the right side area D404 of the display frame as shown by FIG. 12C.

Furthermore, when sensing that the touch action is a sliding gesture, the processing unit 130 performs a moving action on a target in the corresponding display area based on a moving direction of the sliding gesture. Herein, the target is an object such as an option corresponding to a highlighted tip, an icon or a graphic. In addition, the target may also be a cursor, a scroll bar, and so on. An initial position of the target may be determined according to an initial position where the touch action is sensed, and the initial position of the target may also be set to be a fixed position, which is not particularly limited in the invention.

Figure 13A:
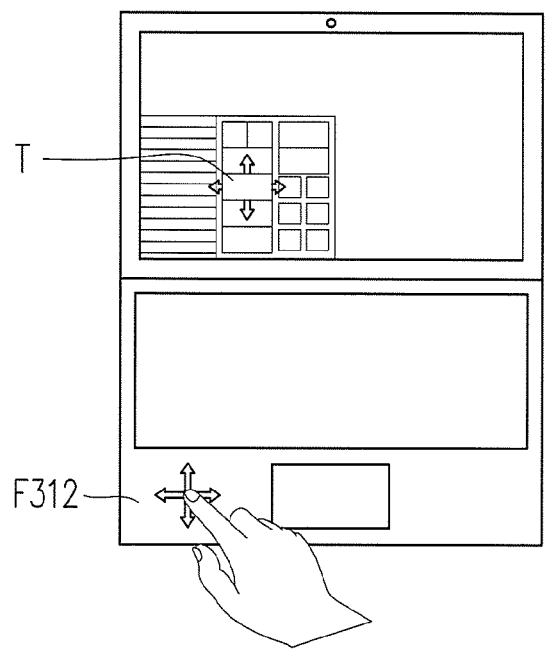
FIG. 13A and FIG. 13F are schematic diagrams illustrating the operating method of the electronic apparatus according to the fifth embodiment of the invention.
Figure 13B:
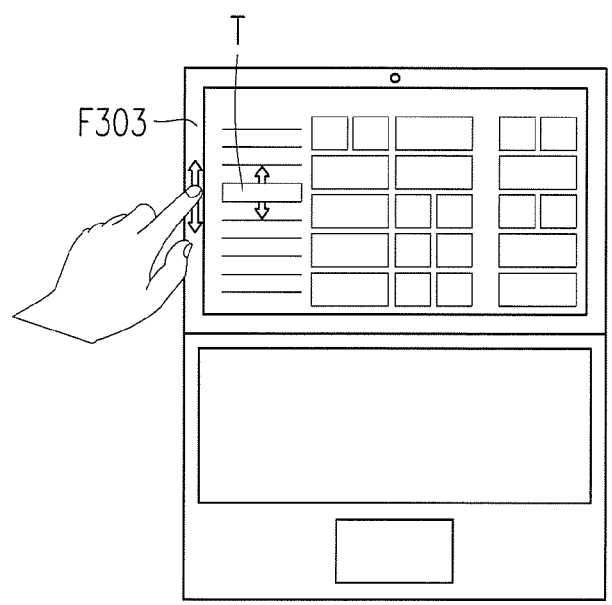
Figure 13C:
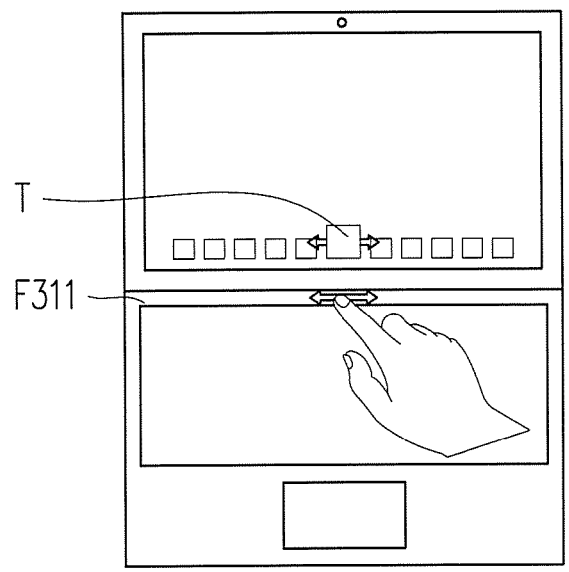
Figure 13D:
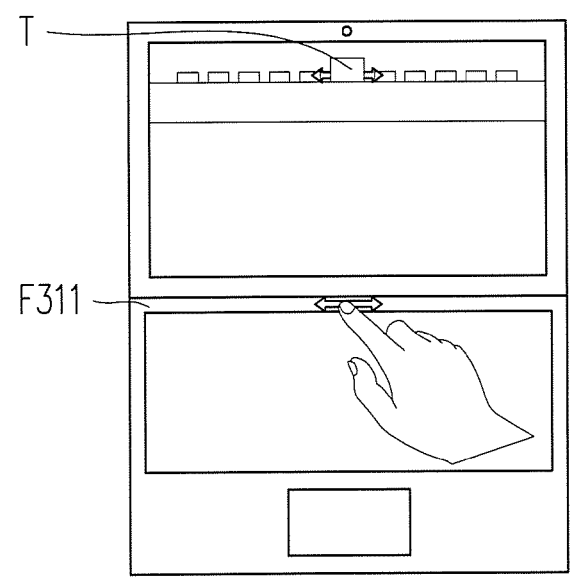
Figure 13E:
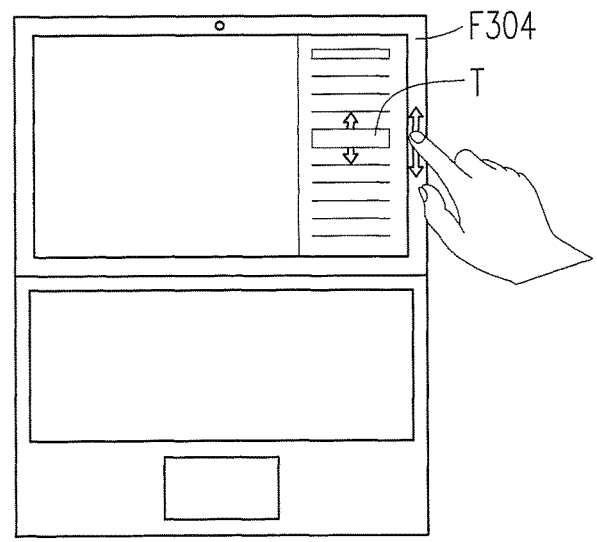
Figure 13F:
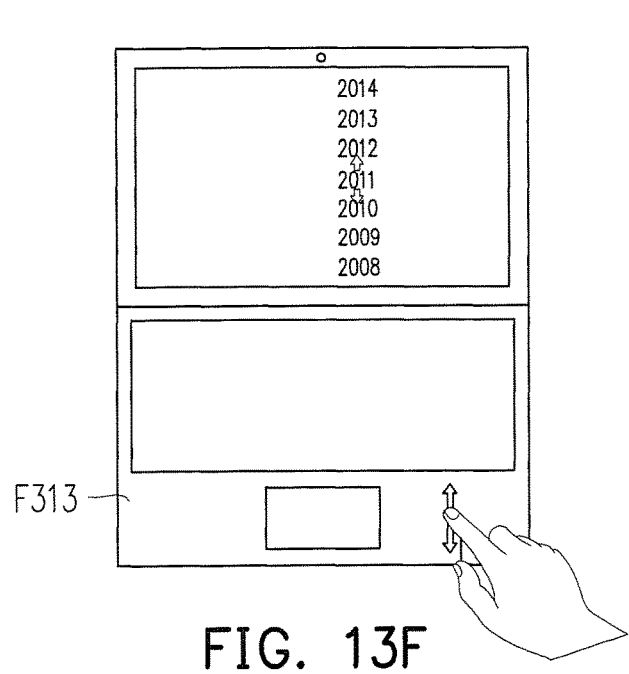

FIG. 13A and FIG. 13F are schematic diagrams illustrating the operating method of the electronic apparatus according to the fifth embodiment of the invention.

In FIG. 13A, the sensing element 11 is disposed on the second area F312 as shown by FIG. 11A, and the corresponding display area to be controlled may be the left side area D403 of the display frame as shown by FIG. 12A. The user performs the sliding gesture on the second area F312 in a vertical direction or a horizontal direction, so as to control a target T in the left side area D403 to move in the vertical direction or the horizontal direction. In FIG. 13A, the target T represents an option that is currently selected.

In FIG. 13B, the sensing element 11 is disposed on the left frame border F303 as shown by FIG. 11A, and the corresponding display area to be controlled may be the left side area D403 of the display frame as shown by FIG. 12A. The user performs the sliding gesture on the left frame border F303 in the vertical direction, so as to control the target T in the left side area D403 to move in the vertical direction. In FIG. 13B, the target T represents an option that is currently selected.

In FIG. 13C, the sensing element 11 is disposed on the first area F311 as shown by FIG. 11B, and the corresponding display area to be controlled may be the bottom edge area D402 of the display frame as shown by FIG. 12B. The user performs the sliding gesture on the first area F311 in the horizontal direction, so as to control the target T in the bottom edge area D402 to move in the horizontal direction. In FIG. 13C, the target T represents a shortcut that is currently selected.

In FIG. 13D, the sensing element 11 is disposed on the first area F311 as shown by FIG. 11B, and the corresponding display area to be controlled may be the top edge area D401 of the display frame as shown by FIG. 12B. The user performs the sliding gesture on the first area F311 in the horizontal direction, so as to control the target T in the top edge area D401 to move in the horizontal direction. In FIG. 13D, the target T represents a tab page that is currently selected.

In FIG. 13E, the sensing element 11 is disposed on the right frame border F304 as shown by FIG. 11C, and the corresponding display area to be controlled may be the right side area D404 of the display frame as shown by FIG. 12C. The user performs the sliding gesture on the right frame border F304 in the vertical direction, so as to control the target T in the right side area D404 to move in the vertical direction. In FIG. 13E, the target T represents an option that is currently selected.

In FIG. 13F, the sensing element 11 is disposed on the third area F313 as shown by FIG. 11C, and the corresponding display area to be controlled may be the right side area D404 of the display frame as shown by FIG. 12C. The user performs the sliding gesture on the third area F313 in the vertical direction, so as to control the target T in the right side area D404 to move in the vertical direction. In FIG. 13F, the target T represents an option that is currently selected.

In summary, according to the foregoing embodiments, the electronic apparatus is capable of dividing the touch pad into multiple touch areas in order to control different user interfaces, wherein each of the touch areas is corresponding to one of the display areas in the display unit, and each of the display areas displays the corresponding one of the user interfaces, such that the functions of the user interface may be controlled by operations in the corresponding touch area to achieve a consistent user experience. Also, said electronic apparatus may also control on/off state of the touch areas through the touch pad, the keyboard and the software options to provide a more flexible use. Further, said electronic apparatus is capable of correspondingly adjusting the operating range of the touch area according to changes in the dimension of the user interface to provide a more intuitive use.

In addition, the display area to be controlled may be correspondingly disposed according to the position where the sensing element is disposed (e.g., disposed in manners of left-to-left, top-to-top, bottom-to-bottom, etc.), such that the user is able to complete gesture operations more intuitively. For applications in devices having the touch pad (e.g., the notebook computer), the sensing element has a characteristic to operate a specific display area, so that the sensing element may perform gesture operations more easily in faster speed and higher efficiency. For applications in devices that uses a touch panel as a major input device (e.g., the tablet computer), a frequency of using the touch panel may be reduced to reduce occurrences of dirty surface on the touch panel. For applications in devices without the touch pad, the keyboard or a touch display panel (e.g., a digital picture frame, a television, a surveillance device), an input method excluding use of an external input device is provided to save spaces in use environment for the user while simplifying original frame design for said devices.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An electronic apparatus, comprising:
   a display unit;
   a base, coupled to the display unit;
   a touch pad, disposed on the base and extended from a first side to a second side of the base, wherein the touch pad has a plurality of touch areas, and receives a first touch action performed by a user on any one of the touch areas;
   a processing unit, coupled to the touch pad, wherein the processing unit sets a display frame of the display unit into a plurality of display areas according to a position where each of the touch areas is located in a longitudinal direction between the first side and the second side of the base, so that each of the touch areas has a corresponding one of the display areas at a corresponding position on the display unit;
   an upper cover, pivoted to the base, wherein the display unit is disposed on the upper cover; and
   a sensing element, disposed on a side edge of at least one of the upper cover and the base, configured to sense a second touch action, and coupled to the processing unit;
   wherein after a first touch event is received by the touch pad, the processing unit obtains a first touch area among the touch areas where the first touch event is generated, and the processing unit displays a first user interface in a first display area among the display areas corresponding to the first touch area,
   wherein the processing unit controls the corresponding one of the display areas on the display unit according to the second touch action sensed by the sensing element, and a position of the corresponding one of the display areas is corresponding to a position where the sensing element is disposed on the at least one of the upper cover and the base,
   when the sensing element is disposed on the upper cover and located on a top frame border of the display unit, the corresponding one of the display areas to be controlled is located on a top edge area of the display frame;

when the sensing element is disposed on the upper cover and located on a bottom frame border of the display unit, the corresponding one of the display areas to be controlled is located on a bottom edge area of the display frame;

when the sensing element is disposed on the upper cover and located on a left frame border of the display unit, the corresponding one of the display areas to be controlled is located on a left side area of the display frame; and when the sensing element is disposed on the upper cover and located on a right frame border of the display unit, the corresponding one of the display areas to be controlled is located on a right side area of the display frame.

2. The electronic apparatus of claim 1, wherein when the first user interface is displayed in the first display area, the processing unit controls operations of functions included by the first user interface according to the first touch action performed by the user in the first touch area and received by the touch pad.

3. The electronic apparatus of claim 1, wherein after a second touch event is received by the touch pad, if a second touch area among the touch areas where the second touch event is generated being different from the first touch area is obtained by the processing unit, the processing unit displays a second user interface in a second display area among the display areas corresponding to the second touch area.

4. The electronic apparatus of claim 3, wherein when displaying the second user interface in the second display area among the display areas corresponding to the second touch area, the processing unit hides the first user interface.

5. The electronic apparatus of claim 1, wherein lengths of each of the touch areas and the corresponding one of the display areas are proportional or identical to each other in the longitudinal direction of the base, each of the touch areas is not overlapped with one another, and a coordinate of each of the touch areas is mapped to a coordinate of the corresponding one of the display areas.

6. The electronic apparatus of claim 1, further comprising:

a keyboard, disposed on the base, and the keyboard having a space key, wherein a length of the touch pad extended from the first side to the second side of the base is greater than a length of the space key, wherein the keyboard provides a first trigger signal, and when receiving the first trigger signal through the keyboard, the processing unit enables a multi-area touch function to divide the touch pad into the touch areas and sets the display frame of the display unit into the display areas according to the position where each of the touch areas is located in the longitudinal direction between the first side and the second side of the base, so that each of the touch areas has the corresponding one of the display areas at the corresponding position on the display unit, wherein the keyboard provides a second trigger signal, and when receiving the second trigger signal through the keyboard, the processing unit disables the multi-area touch function.

7. The electronic apparatus of claim 1, wherein the first user interface is an interface of a multimedia player, and an operating range in the first touch area is used to control a time bar of the multimedia player, when a dimension of the interface of the multimedia player is changed, correspondingly changing the operating range of the first touch area.

8. The electronic apparatus of claim 1, wherein the touch pad comprises a ring circuit, and the ring circuit surrounds the touch areas.

9. The electronic apparatus of claim 1, wherein after receiving an interaction trigger signal, the processing unit determines the corresponding one of the display areas to be controlled based on the position where the sensing element is disposed.

10. The electronic apparatus of claim 1, further comprising:

a keyboard, disposed on the base, and coupled to the processing unit;

wherein when the sensing element is disposed on the base and located on a second area at left of the touch pad, the corresponding one of the display areas to be controlled is located on a left side area of the display frame; and when the sensing element is disposed on the base and located on a third area at right of the touch pad, the corresponding one of the display areas to be controlled is located on a right side area of the display frame.

11. The electronic apparatus of claim 1, wherein when sensing that the second touch action is a sliding gesture, the processing unit performs a moving action on a target in the corresponding display area based on a moving direction of the sliding gesture.

12. An operating method of an electronic apparatus having a display unit, a base, an upper cover, a sensing element and a touch pad, comprising:

receiving a first touch action performed by a user through the touch pad, wherein the touch pad having a plurality of touch areas is disposed on the base, and the touch pad is extended from a first side to a second side of the base;

setting a display frame of the display unit into a plurality of display areas according to a position where each of the touch areas is located in a longitudinal direction between the first side and the second side of the base, so that each of the touch areas has a corresponding one of the display areas at a corresponding position on the display unit, wherein each of display areas is controlled by a corresponding one of the touch areas;

obtaining a first touch area among the touch areas where a first touch event is generated after the first touch event is received by the touch pad, and displaying a first user interface in a first display area among the display areas corresponding to the first touch area; and controlling the corresponding one of the display areas on the display unit according to a second touch action sensed by the sensing element, and a position of the corresponding one of the display areas is corresponding to a position where the sensing element is disposed on the at least one of the upper cover and the base, wherein the display unit is disposed on the upper cover, wherein the sensing element is configured to sense the second touch action, wherein when the sensing element is disposed on the upper cover and located on a top frame border of the display unit, the corresponding one of the display areas to be controlled is located on a top edge area of the display frame;

when the sensing element is disposed on the upper cover and located on a bottom frame border of the display unit, the corresponding one of the display areas to be controlled is located on a bottom edge area of the display frame;

when the sensing element is disposed on the upper cover and located on a left frame border of the display unit, the corresponding one of the display areas to be controlled is located on a left side area of the display frame; and when the sensing element is disposed on the upper cover and located on a right frame border of the display unit, the corresponding one of the display areas to be controlled is located on a right side area of the display frame.

13. The operating method of claim 12, further comprising: when the first user interface is displayed in the first display area, controlling operations of functions included by the first user interface according to the first touch action performed by the user in the first touch area and received by the touch pad.

14. The operating method of claim 12, further comprising: after a second touch event is received by the touch pad, if a second touch area among the touch areas where the second touch event is located being different from the first touch area is obtained, displaying a second user interface in a second display area among the display areas corresponding to the second touch area.

15. The operating method of claim 14, further comprising: when displaying the second user interface in the second display area among the display areas corresponding to the second touch area, hiding the first user interface.

16. The operating method of claim 12, wherein lengths of each of the touch areas and the corresponding one of the display areas are proportional or identical to each other in the longitudinal direction of the base, each of the touch areas is not overlapped with one another, and a coordinate of each of the touch areas is mapped to a coordinate of the corresponding one of the display areas.

17. The operating method of claim 12, wherein the electronic apparatus further comprises a keyboard, and the keyboard is disposed on the base and has a space key, wherein a length of the touch pad extended from the first side to the second side of the base is greater than a length of the space key;

wherein the operating method further comprises:
when receiving a first trigger signal through the keyboard, enabling a multi-area touch function to divide the touch pad into the touch areas, and setting the display frame of the display unit into the display areas according to the position where each of the touch areas is located in the longitudinal direction between the first side and the second side of the base, so that each of the touch areas has the corresponding one of the display areas at the corresponding position on the display unit; and
when receiving a second trigger signal through the keyboard, disabling the multi-area touch function.

18. The operating method of claim 12, wherein the first user interface is an interface of a multimedia player, and an operating range in the first touch area correspondingly is used to control a time bar of the multimedia player, wherein the operating method further comprises:
when a dimension of the multimedia player is changed, correspondingly changing the operating range of the first touch area.

19. An electronic apparatus, comprising:
a display unit;
a base, coupled to the display unit;
a touch pad, disposed on the base and extended from a first side to a second side of the base, wherein the touch pad has a plurality of touch areas, and receives a first touch action performed by a user on any one of the touch areas; and
a processing unit, coupled to the touch pad, wherein the processing unit sets a display frame of the display unit into a plurality of display areas according to a position where each of the touch areas is located in a longitudinal direction between the first side and the second side of the base, so that each of the touch areas has a corresponding one of the display areas at a corresponding position on the display unit;
an upper cover, pivoted to the base, wherein the display unit is disposed on the upper cover;
a sensing element, disposed on a side edge of at least one of the upper cover and the base, configured to sense a second touch action, and coupled to the processing unit; and
a keyboard, disposed on the base, and coupled to the processing unit;
wherein after a first touch event is received by the touch pad, the processing unit obtains a first touch area among the touch areas where the first touch event is generated, and the processing unit displays a first user interface in a first display area among the display areas corresponding to the first touch area,
wherein the processing unit controls the corresponding one of the display areas on the display unit according to the second touch action sensed by the sensing element, and a position of the corresponding one of the display areas is corresponding to a position where the sensing element is disposed on the at least one of the upper cover and the base,
when the sensing element is disposed on the base and located on a first area above the keyboard, the corresponding display area to be controlled is located on a top edge area or a bottom edge area of the display frame;
when the sensing element is disposed on the base and located on a second area at left of the touch pad, the corresponding display area to be controlled is located on a left side area of the display frame; and
when the sensing element is disposed on the base and located on a third area at right of the touch pad, the corresponding display area to be controlled is located on a right side area of the display frame.

* * * * *